(12) United States Patent
Gelmetti

(10) Patent No.: US 6,938,767 B2
(45) Date of Patent: Sep. 6, 2005

(54) CONTAINER FOR WELDING WIRE

(75) Inventor: Carlo Gelmetti, Lazise (IT)

(73) Assignee: Sidergas SpA (IT)

( * ) Notice: Subject to any disclaimer, the term of this patent is extended or adjusted under 35 U.S.C. 154(b) by 63 days.

(21) Appl. No.: 10/242,029

(22) Filed: Sep. 12, 2002

(65) Prior Publication Data
US 2003/0052030 A1 Mar. 20, 2003

(30) Foreign Application Priority Data
Sep. 19, 2001 (IT) .................................... TO2001A0894

(51) Int. Cl.[7] ............................................. B65D 85/04
(52) U.S. Cl. ..................... 206/408; 206/386; 206/397; 229/199; 242/171
(58) Field of Search .................. 242/159, 160.1–160.4, 242/170, 171; 206/389, 395–397, 407–409, 453, 586, 303, 386; 229/125.21, 125.22, 199

(56) References Cited

U.S. PATENT DOCUMENTS

| | | | |
|---|---|---|---|
| 3,244,347 A | 4/1966 | Jenk | |
| 3,648,920 A | 3/1972 | Stump | |
| 3,939,978 A | 2/1976 | Thomaswick | 206/454 |
| 4,161,248 A | 7/1979 | Kalmanovitch | 206/389 |
| 4,392,606 A * | 7/1983 | Fremion | 206/600 |
| 4,451,014 A | 5/1984 | Kitt et al. | 242/128 |
| 5,201,419 A * | 4/1993 | Hayes | 206/409 |
| 5,553,810 A * | 9/1996 | Bobeczko | 242/601 |
| 5,738,209 A | 4/1998 | Burr et al. | 206/397 |
| 5,921,391 A * | 7/1999 | Ortiz et al. | 206/397 |
| 5,988,370 A * | 11/1999 | Roemer et al. | 206/215 |
| 6,564,943 B2 * | 5/2003 | Barton et al. | 206/395 |
| 2003/0042162 A1 * | 3/2003 | Land | 206/408 |

FOREIGN PATENT DOCUMENTS

| | | |
|---|---|---|
| EP | 584056 | 2/1994 |
| EP | 0 665 166 | 1/1995 |
| EP | 1 057 751 | 12/2000 |
| EP | 1 275 595 | 1/2003 |
| FR | 2 267 255 | 4/1974 |
| GB | 2 264 482 | 9/1993 |
| WO | WO 94/19258 | 9/1994 |
| WO | WO 98/52844 | 11/1998 |

* cited by examiner

*Primary Examiner*—Jim Foster
(74) *Attorney, Agent, or Firm*—Hayes Soloway P.C.

(57) ABSTRACT

A container for welding wire comprises a box-like body having a bottom and a side wall, the side wall having a polygonal cross section with corners, and stabilizing elements arranged at at least some of the corners. The stabilizing elements extend upwardly from the bottom and have an outer shell portion comprising a corner portion facing the adjacent side wall and an inner portion facing an interior of the container for housing welding wire. The corner portion has a shape adapted to the shape of the adjacent corner. The inner portion defines a continuous inner wall.

27 Claims, 8 Drawing Sheets

CONTAINER FOR WELDING WIRE

TECHNICAL FIELD

The invention relates to a container for welding wire.

BACKGROUND OF THE INVENTION

A container for welding wire serves to accommodate a bulk welding wire coil used in automatic and semi-automatic welding processes. The container has two primary functions. First, the container serves as a means for transporting the welding wire coil and protecting it. In particular, the container is to be made sufficiently rigid to prevent the individual turns of the welding wire coil to be displaced one relatively to the other. Second, the container serves as take-out device allowing continuous withdrawal of the welding wire from the coil.

When the container is completely filled with the wire, the wire exerts a radial pressure into the side wall which tends to deform the polygonal container.

To avoid such deformation, EP 0 636 098 B1 suggests to place a stabilising device at each corner of the side wall which device extends upwardly from the bottom and comprises angular elements of folded cardboard and wooden boards accommodated in the angular elements.

It is one object of the present invention to provide a container for welding wire which can be filled with an increased mass of welding wire, which is easy and cheap in its manufacture and which has a high stability avoiding deformation and squeezing of the body due to the load of the wire.

It is a further object of the present invention to allow double stacking of containers when filled with welding wire without leading to a deformation of the lower container.

A further welding wire container which is known from WO 98/52844 has a body and a lid made of cardboard with two inspection windows allowing a limited view into the interior of the body. The container is shipped with the lid. However, the container requires to first remove the lid from the container, in order to insert a wire conduit device. The wire conduit device defines a separate, additional guide means between a retainer lying on the wire coil and the lid and it acts as a support frame for the lid. After opening the container and inserting the wire conduit device, the end of the wire is to be pulled through a sleeve of the wire conduit device and a guiding hole in the lid. Finally, the lid is re-mounted to the top of the container so as to close it again and prevent contamination of the interior of the container. However, the described procedure from opening to re-mounting of the lid is time-consuming. Further, it cannot be excluded that the container remains opened for some hours or days after removing the lid allowing dirt and moisture to enter into the container so that the wire is soiled or immediately oxidises. A further reason that the container according to the state of the art is opened by the purchaser of the container is that the inspection windows do not allow a complete inspection of the interior for initiating the welding process or during the welding process, in order to check the quality of the wire and the remaining content of the container, respectively.

It is a further object of the present invention to provide a container for welding wire which allows to unwind wire in a minimum set-up time. Furthermore, contamination and oxidation of the wire should be excluded by avoiding opening of the container.

BRIEF SUMMARY OF THE INVENTION

The invention provides a container for welding wire comprising a box-like body having a bottom and a side wall, the side wall having a polygonal cross section with corners, and comprising stabilising elements arranged at at least some of the corners. The stabilising elements extend upwardly from the bottom and have an outer shell portion comprising a corner portion facing the adjacent side wall and an inner portion facing an interior of the container for housing welding wire. The corner portion has a shape adapted to the shape of the adjacent corner. The inner portion defines a continuous inner wall.

This arrangement avoids deformation of the coil and the body during transportation or stacking. When the wire is unwound from the coil and the height of the coil decreases, the above-mentioned retainer can easily descend, sliding unhindered along the stabilising elements. The present invention provides a container with cheap stabilising elements of superior stability which prevent the container from deformation and which allows a more continuous feed of the wire. Further, the corner supports still leave enough empty space in the corners of the polygonal body in which tips of a retainer braking element, made of plastic, wire or any other material, can extend beyond the wire coil to prevent wire strands from lifting along an outer perimeter of the wire coil.

In order to achieve the above advantages the present invention further provides a container for welding wire, comprising a box-like body having a bottom and a side wall, the side wall having a polygonal cross section with corners, and comprising stabilising elements arranged at at least some of the corners. The stabilising elements extend upwardly from the bottom and have an outer shell portion comprising a corner portion facing the adjacent side wall and an inner portion facing an interior of the container for housing welding wire. The corner portion tapers towards an outer edge contacting the adjacent corner, and the corner portion and the inner portion define an integral piece.

The invention uses the effect that the radial pressure is used to stabilise the outer shape of the body by transmitting the radial pressure directly into the corner and not into the flat wall portions between two adjacent corners. For this reason, the inner wall is continuous and not slitted as known from EP 0 636 098 B1 so that the inner wall has a high stability and transmits the force via the corner portions into the body's corner. The above effect is also achieved by the corner and the inner portion defining an integral piece. This further stabilises the position of the inner portion so that a lateral yielding or displacement of the inner portion due to the radial pressure which can slightly amend its direction during shipping can be avoided.

According to the preferred embodiment, the corner portion continues in one piece with the inner portion to have a circumferentially closed outer shell portion. Thus, the stabilising elements do not have a slitted outer shell portion or outer wall and have an increased stability.

In one preferred embodiment, the stabilising elements have a cross-shape with a rounded inner portion or, more generally, an inner portion bulging toward the interior and with a corner contact portion having a shape adapted to the associated corner of the side wall. The stabilising elements act as a supporting inner box frame. The welding wire contacts the stabilising elements at the rounded inner portion with low friction between the wire and the stabilising elements allowing a very continuous feed. Due to the rounded geometry, the stabilising elements obtain a high resistance to the forces exerted by the wire. Further, the forces generated by the wire is directly transmitted into the corner portions and into the corner. The rounded inner portion also avoids buckling of the stabilising elements under the radial and, when double-stacked, axial loads. The corner contact portion, however, is not rounded but adapted to the associated corner so that the side wall and the stabilising element contact each other at a large surface area and transmits the forces into the corner of the body. The corner contact portion supports the corner of the side wall so that the corner can maintain its original shape. Furthermore, the stabilising element is perfectly positioned in the corner of the body and is, thus, prevented from any displacement within the container.

Although it is possible that the angle defining the corner contact portion slightly differs from the angle defining the vertical corner of the side wall, both angles are preferably the same. The corner contact portion is defined by two flat portions of the stabilising element.

The stabilising elements could be made from wood, metal (e.g. light metal) or any other material. Wood, however, absorbs and releases moisture, oxidising the wire and making it unusable. Therefore, the stabilising element is preferably made from metal cardboard and plastics and is preferably hollow to have a reduced weight.

In one embodiment, the body has a rectangular shape, e.g. a square shape. The contact portion is defined by two flat wall portions extending in an angle of 90° with respect to each other.

According to the preferred embodiment, the container when filled with welding wire is of such shape and such stability that containers of the same design and filled with welding wire can be double-stacked with a bottom of an upper container being placed on a lower container.

When the stabilising elements protrude over an upper end of the side wall, it is assured that the load of the upper container is firstly transmitted into the stabilising elements and not directly into the side walls which have a reduced stability. This important improvement is not limited to a container having stabilising elements as defined in claim 1. Rather, the stabilising elements protruding over the upper end of the side wall are an important inventive improvement for a container for welding wire per se.

The present invention allows to have more than 250 kg of welding wire packed into a container according to the invention.

One further embodiment of the invention provides an inner wall arranged between the wire and the stabilising elements. The inner wall circumscribes the wire by contacting the wire with its inner side. Its outer side is contacted by the stabilising elements. The inner wall which preferably has a circumferentially closed cross-section acts like a box in the box. The inner wall gives the wire a close axial guide and takes up the radial pressure exerted by the wire to transmit the pressure to the stabilising elements, only. Further, a wire coil has more contact points along its radial outer end.

As one further main object, the invention further provides a container for welding wire, comprising a box-like body of any shape, e.g. cylindrical or polygonal, having a bottom and a sidewall and comprising a lid at the top of the body closing the container. The lid consists of transparent material allowing a visual inspection of the interior of the container. The lid and the body are of such shape and such stability that containers of the same design can be at least double-stacked with the bottom of the upper container standing on the lid of the lower container.

The container according to the invention has, contrary to the container shown in 5 WO 98/52844, a lid made of one material which is transparent so that a complete inspection of the 6interior of the container is achieved, at any time, during storage, shipping and use. The lid itself is attached to the body during shipping and during the later unwinding of the wire. The one-piece lid is simple and cheap in its manufacture. The transparent lid allows the user to control the wire from outside without removing the lid so that contamination of the interior by opening the container can be avoided. In order to allow the lid to be permanently placed onto the body, the lid and the body are of such shape and stability that at least double-stacking of the containers when filled with the wire are allowed during shipping and storage. This important improvement is not limited to a container having stabilising elements with a particular shape.

Although truncated, transparent cones are known which are placed onto the body after having removed a separate lid for shipping, and re-used many times over, such cones are not suitable to be used when shipping and do not allow double-stacking of the containers. Besides, the re-use of such cones for a long period of time compromises the vision of the interior of the container because of the inevitable accumulation of dirt, dust and grease from the environment in which these containers are normally being utilised.

As the lid of the container according to the invention is only used once and is therefore always new for each container, a clean and perfect vision and inspection of the interior of the container is guaranteed. Further, as the lid of the container according to the invention is of one piece only its disposal or recycling is facilitated.

Although the lid can be of glass, in a preferred embodiment the lid is made of plastics, e.g. from PE or PP, and moulded or stamped in one piece.

The lid has an upper plate-shaped portion and a downwardly extending ring-shaped collar engaging around the outer periphery of the upper edge of the sidewall. Thus, the collar is able to give the body a certain support in the radial direction as the wire exerts radial forces into the body.

The stabilising element may not only increase the stability of the container against radial but also against axial load. If the stabilising elements protrude over the upper end of the side wall, the collar extends downwardly to the upper end of the side wall to be fixed thereto. As the side wall of the body does not extend to the upper end of the body which is defined by the stabilising elements, the transparent collar closes the gap between the upper end of the side wall and the upper end of the stabilising elements so that it is possible to have a side view into the interior of the container by looking through the transparent collar.

According to the preferred embodiment, a seal is provided between the lid and the body preventing moisture and dirt from entering into the container. As, according to the invention, it is not necessary to open the container after shipping and during use, the seal remains unbroken, and oxidation of the wire can be completely avoided.

One example for the seal is an adhesive tape or a tight plastic foil which further attaches the lid to the body. The adhesive tape can be wrapped around the lower edge of the ring-shaped collar and the outer periphery of the upper edge of the sidewall. An adhesive tape or tight plastic foil has a further advantage, especially when used with side walls made of cardboard. The user immediately can find out whether the container was opened before as the adhesive connection or the foil is at least partly destroyed.

The container according to the invention may have a retainer for downholding the wire coil strands which retainer sits on the wire during shipping and during unwinding. The lid has a the wire-exiting hole, and the wire extends upwards from the retainer. A separate fitting means underneath the lid for fitting a conduit device as it is known from WO 98/52844 can be avoided. According to the invention the wire conduit device for subsequent feeding of the welding machine can be directly fitted to the lid as the lid has enough stability. Further, opening of the lid only for the purpose of inserting a separate fitting means is superfluous.

The preferred embodiment of the invention provides that, in the shipping state of the container in which the container is filled with welding wire, a wire end already extends outwardly from the container through a wire-exiting hole in the lid. The outwardly extending wire end is attached to the container. This specific arrangement of the wire end during shipping of the container allows an immediate start of the wire unwinding without removing the lid. If the end of the wire extends through the wire-exiting hole, it is preferably attached to the lid by an adhesive tape or plastic foil which further seals the hole close and prevents moisture from entering into the container. The adhesive tape or plastic foil, thus, has a double-function.

The lid may have an upper plate-shaped portion with an upwardly protruding centre portion. This centre portion can be of convex shape. The centre portion gives the lid more stiffness facilitating to attach the fitting of a tube-shaped conduit device onto the lid. The protruding centre portion also helps aligning containers during stacking. The centre portion may have the function of a guiding cone. Further, a sideward displacement of stacked containers relative to each other during shipping can be avoided.

The plate-shaped portion of the lid has a flat outer portion surrounding the protruding centre portion. In the stapled state of the containers, the upper container stands on the flat outer portion of the lower container so that the protruding centre portion is not deformed.

The flat outer portion may have a rough finish surface to disguise possible scratches caused by double-stacking and to increase the friction between stacked containers. Even if the surface is rough finished, the lid will be at least translucent in the flat outer portion allowing more light to fall into the container and improving the inspection of the container content through those portions of the lid which are not rough finished.

The bottom of the lid may comprise a pallet so that the pallet of the upper container contacts the lid of the lower container during shipping or storage.

A further option to avoid deformation of the filled container is to use a support means in form of a closed ring extending along the periphery of the body. The support means can be a reinforcing band or strip, preferably a tape like a adhesive tape wrapped around the outer periphery of the body. The tape can be the same tape which is used for sealing the lid and the body.

The above defined transparent lid is, according to the preferred embodiment used in connection with the stabilising elements, explained above to generate a container of high stability allowing an excellent visual inspection. However, some of the above advantages can be achieved by the lid, only, so that a polygonal or cylindrical container with the transparent lid per se leads to an important improvement of a welding wire container.

The use of a cylindrical central core fixed to the body or movable is known. Such central cores also absorb vibrations while wire is being fed at very high speed. However, the existing cores with a cylindrical shape lead to the following problems. When most of the wire has been pulled out and only some remain in the lower part of the container, the wire comes out at a very sharp and odd angle which causes unwanted wire bending and unreliable welds. Further, the exiting wire scratches on the core upper edge, wearing the core which is normally made of cardboard and denting the edge. The wire itself may catch in the dents and jam.

It is an important object of the present invention to provide a container with a central core arranged on the bottom and extending upwardly through the middle of the coil which core improves sorting wire layers in case one or more fall into the container. Furthermore, the container according to the invention should have a core avoiding unwanted wire bending during withdrawal of wire.

In order to achieve the above object and to avoid the above disadvantages, the invention provides a container for welding wire comprising a box-like body having a bottom and a side wall and comprising a lid at the top of the body for closing the container. The central core arranged on the bottom tapers in the upward direction. According to the preferred embodiment, the core has a frusto-conical or pyramidal shape. By using a tapering core the wire comes out at a smoother angle, gently touching on the whole length of the core. Wearing at the upper edge of the core can be avoided.

If the central core is hollow and of such shape that a plurality of such cores are able to be stacked one into another, the user of the containers is able to transport a high number of used cores for recycling or disposal at a minimum volume. As could be seen in tests of the container according to the invention, the central core can be simply placed on the bottom without being fixed thereto in order to fulfil the above objects.

The invention is now described with reference to preferred embodiments which are shown in the enclosed drawings.

DETAILED DESCRIPTION OF PREFERRED EMBODIMENTS

Figure 1:
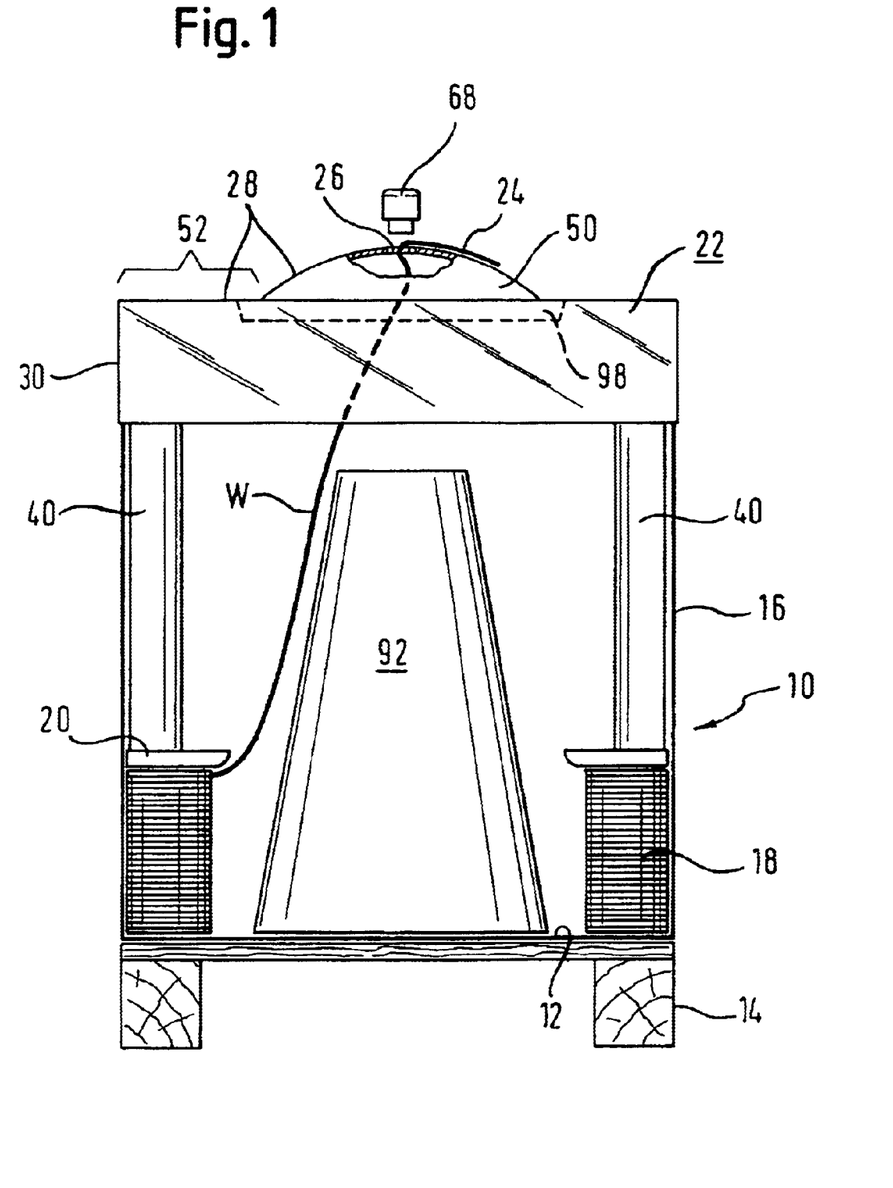
FIG. 1 is a longitudinal section view through a container according to one embodiment of the invention.

A container for accommodating of welding wire W according to a first embodiment is shown in FIG. 1. The container comprises as main components a box-like body 10 having a bottom 12 which is supported by a pallet 14 defining a lower part of the bottom. The box-like body further has a side wall 16 which is, in the circumferential direction, closed. The bottom and the side wall are, according to the preferred embodiment, made from cardboard. The pallet 14 is of wood.

A coil 18 of welding wire W is arranged within the container. A retainer 20, which is ring-shaped, sits on the welding wire W for downholding the wire coil strands. The upper end of the wire extends upwards from the retainer 20 to a lid 22 which closes the container and which is placed on top of the box-like body 16 which latter having an open upper side. The lid 22 has a central wire-exiting hole 24 through which the wire end 24 extends even in the shipping state which is shown in FIG. 1. The wire-exiting hole is defined by a reinforcement ring in the form of a rivet 26 which is attached to the lid 22 (see also FIG. 5).

The lid 22 is of transparent material only (with the exception of the rivet 26) and is made from one piece. According to the preferred embodiment, the lid is of plastics, e.g. PE or PP, which has a thickness of only 1 or 2 mm and is moulded, e.g. injection-moulded, in one-piece or stamped and pressed by use of heated moulds.

Figure 4:
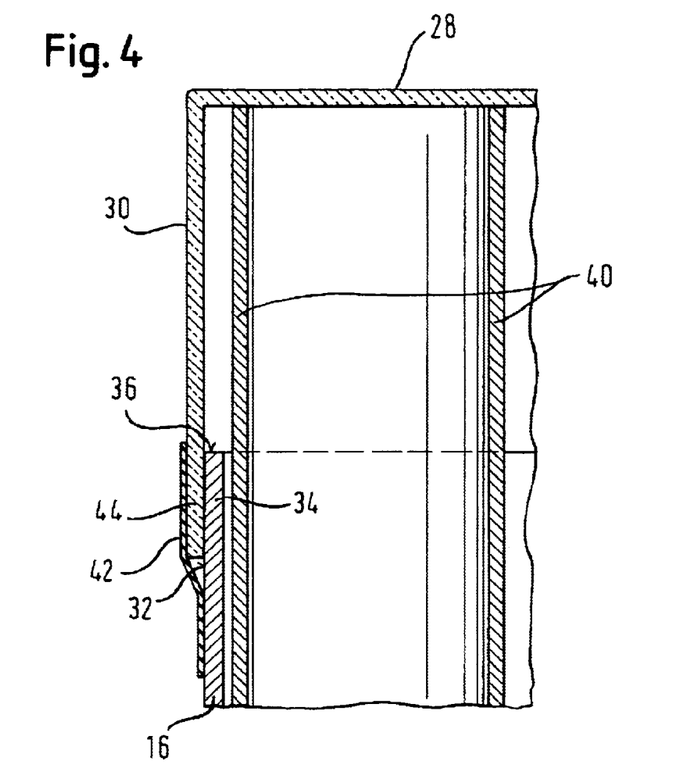
FIG. 4 is a longitudinal section view of the upper end of one corner of the container along line IV—IV in FIG. 3.

The lid has an upper plate-shaped portion 28 and a ring-shaped collar 30 which extends downwardly from the plate-shaped portion 28 and which engages around the outer periphery 32 (see FIG. 4) of the upper edge 34 of the side wall 16.

The upper end 36 of the side wall 16 may extend up to the plate-shaped portion 28 to contact it.

However, according to one preferred embodiment, the upper end 36 is distanced from the plate-shaped portion 28. In this embodiment, the lid 28 lies on stabilising elements 40 which are part of the body and extend upwardly from the bottom 12 to the lid 28 protruding over the upper end 36 of the sidewall 16 to the plate-shape portion 28. The stabilising elements 40 are made from cardboard and are hollow.

The collar 30 extends downwardly to the upper end 36 of the side wall 16 and overlaps the upper edge 34 and is fixed to the side wall at its upper edge 34. For fixing the lid 22 to the side wall 16, an adhesive, preferably transparent tape or tight plastic foil 42 is wrapped around the lower end 44 of the ring-shaped collar 30 and the outer periphery of the upper edge 34 of the side wall 16. The adhesive tape or foil 42 further acts as a seal preventing moisture from entering into the container.

As the lid 28 is all transparent, a visual inspection of the content of the container can be made from above (through the plate-shaped portion) or from the side (through the collar 30). The visual inspection from the side through the transparent collar thus allows visual inspection of the containers' interior even if the containers are stacked one on top of another during storage or transportation (see FIG. 6).

Figure 6:
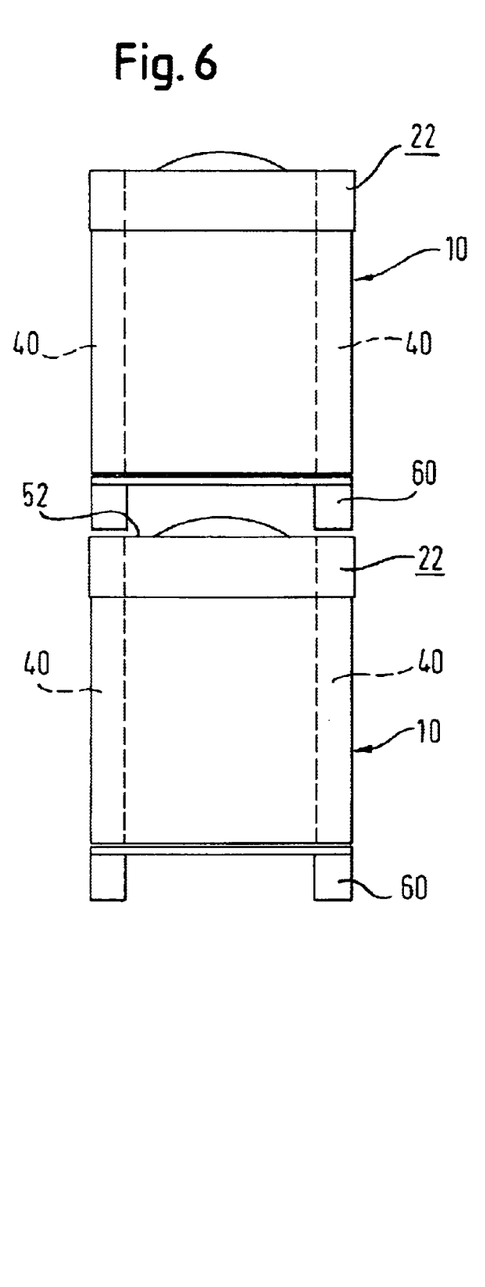
FIG. 6 is a side view of two containers according to the invention stacked one on top of another.

The container allows shipping and later fitting of a wire conduit device of a welding machine and withdrawal of the wire without opening of the container. For shipping purposes, the lid and the body are of such shape and such stability that containers of the same design can be stacked onto each other when filled with the wire so that the bottom of the upper container is placed on the lid of the lower container as can be seen in FIG. 6. The horizontal braces 60 of the pallet 14 which define part of the body contact the lid close to its radial outer edge where the stabilising elements 40 are arranged. Therefore, the load of the upper container is transferred through the lid 22 into the stabilising elements 40 and, finally, to the ground.

A further reason why the container is immediately ready for use is that in the shipping condition the wire end 24 already extends through the wire-exiting hole 64.

The wire end 24 is attached to the lid by an adhesive tape 66 which further sealingly closes the wire-exiting hole so as to prevent moisture from entering into the container. The adhesive tape 66 is only to be removed, and a fitting 68 of a conduit device is to be attached to the lid. The rivet 26 shown in FIG. 5 may help to securely attach the fitting 68 to the lid 22.

Figure 2:
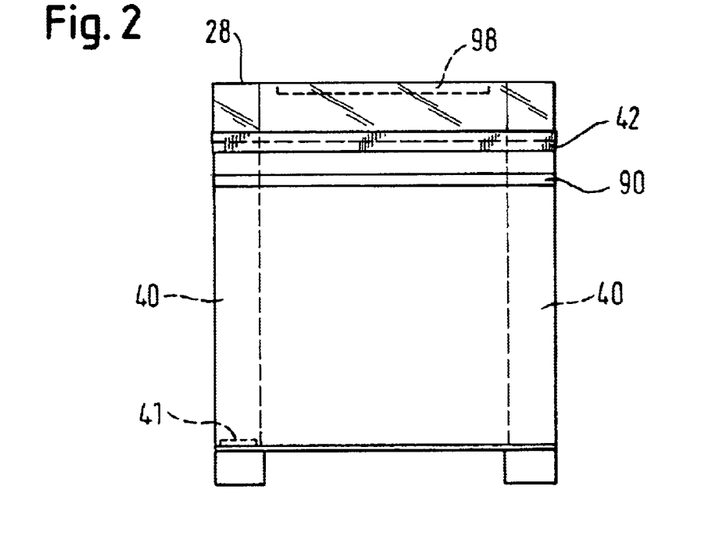
FIG. 2 is a side view of a container according to a second embodiment.

According to the embodiment shown in FIG. 2, the upper plate-shaped portion 28 of the lid is completely plain.

However, according to the embodiment shown in FIG. 1, the upper plate-shaped portion 28 has a convex- or dome-shaped hollow centre portion 50 and a flat outer portion 52 which is ring-shaped and which surrounds the centre portion 50.

Figure 5:
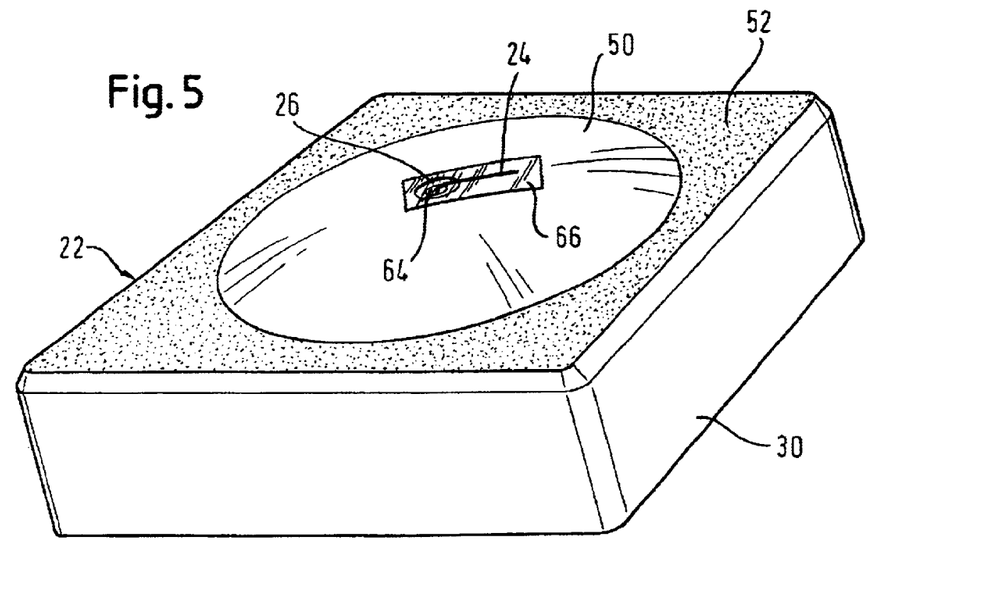
FIG. 5 is a perspective view of the lid according to one embodiment used with the container according to the invention.

The flat outer portion 52 may have a rough finish surface as seen in the embodiment according to FIG. 5 whereas the protruding centre portion 50 is completely transparent. Even if the outer portion 52 is rough, this portion is at least translucent allowing more light to enter the interior of the container.

The lid has a slightly conical shape by the collar 30 slightly tapering in the upward direction. This shape facilitates installation of the lid onto the body and allows stacking of a number of lids one into another and, thus, an easier transport for recycling or disposal. As the lid is of plastics which can be recycled and of one material only, the recycling or disposal is further facilitated.

For increasing the stability and rigidity of the lid 20, the lid may have ribs 98, for example on the lower side of the plate-shaped portion 28. The ribs 98 are formed on the plate-shaped 28 portion and are formed when moulding or forming the lid.

Figure 3:
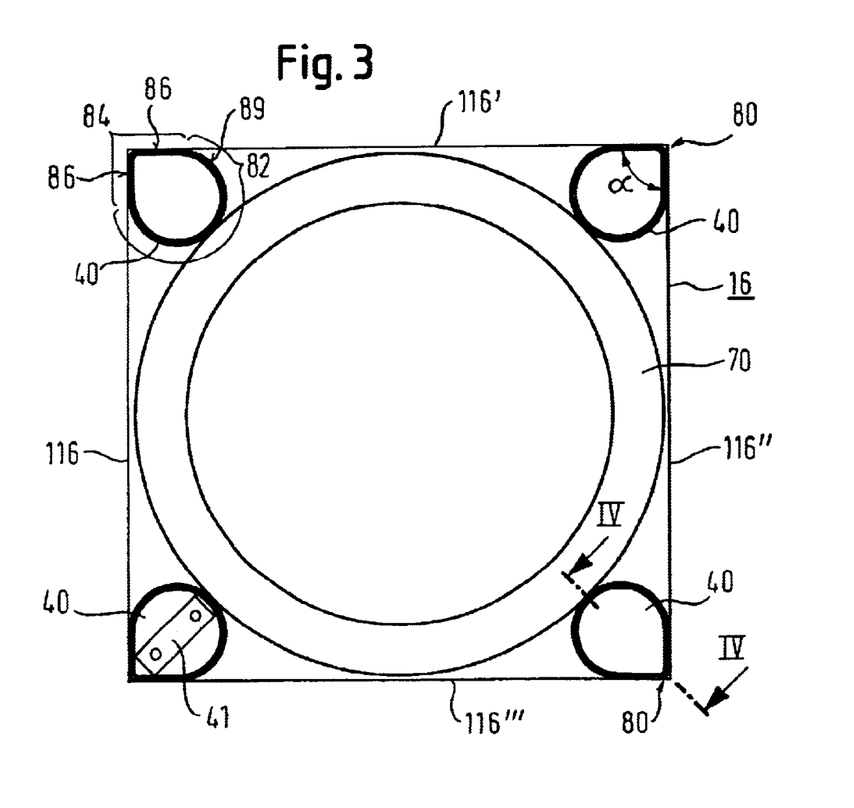
FIG. 3 is a plan view of the container according to FIGS. 1 and 2.

According to the preferred embodiments of FIGS. 1 and 2, the body has a polygonal, more precisely a square shape as can be seen from FIG. 3. Elongated stabilising elements 40 extending from the bottom 12 along the corresponding corner upwards to protrude over the upper end of the side wall are arranged at each corner 80 of the body 10. The stabilising elements have a rounded inner portion 82 in the form of a segment of a circle facing the interior of the container and a corner contact portion 84 which is defined by two flat sections 86 extending in an angle α of 90° with respect to each other and facing the adjacent side wall. The angle α corresponds to the angle of the corners 80 between adjacent panels 116, 116', 116", 116''' of the side wall 16 so that the side wall 16 is contacted by the corner portion 84 over a large area. The stabilising elements 40 prevent bulging and deformation of the complete container caused by the pressure of the wire coil 70 acting in the radial outward direction. The stabilising elements 40 take up the pressure of the wire coil 70 to transmit it directly into the corners 80 so that the panels 116 to 116''' are not deformed.

To achieve a high stability of the stabilising elements 40, the inner portion 82 defines a continuous inner wall, i.e. there is no elongated vertical slit provided in the inner portion 84. Rather, the inner portion is one piece.

In all embodiments shown in the drawings, the corner portion 84 continues in one piece with the inner portion 82. The embodiment according to FIG. 3 shows (like most of the other embodiments) stabilising elements 40 having a circumferentially closed outer shell portion 89 or outer wall defined by the outer surface of the corner portion 84 and the inner portion 82 which continue in one piece with each other. Due to the closed outer shell portion 89, the stability of the entire stabilising elements 40 and not only of the inner portion 82 is increased with respect to a cylindrical stabilising element which has a vertical slit or is open to its interior. With those embodiments comprising hollow stabilising elements, the outer shell portion 89 is always defined by a circumferentially closed, ring shaped outer wall.

It is to be emphasized that stabilising elements 40 do not have to be arranged in each corner 80. Especially if there are more than four corners, it is sufficient to have some corners 80 provided with stabilising elements 40. In order to allow double-stacking, at least three, preferably four corners 80 should have stabilising elements 40. A positioning element 41, preferably of wood and of only a few centimeters height, is nailed onto the bottom 12 and protrudes into the hollow stabilising element 40 to avoid any sideward displacement of the associated stabilising element 40 which is only stacked onto the positioning element 41 (see FIGS. 2 and 3). Usually, each stabilising element 40 has its associated positioning element 41.

The deformation of the container due to the load of the wire W can be further reduced by additional support means in the form of a close ring extending along the periphery of the body. This support means is, for example, a tape 90 wrapped around the outer periphery of the body (see FIG. 4). The support means is, according to a preferred embodiment, arranged close to the upper end of the side wall 16.

Figure 7:
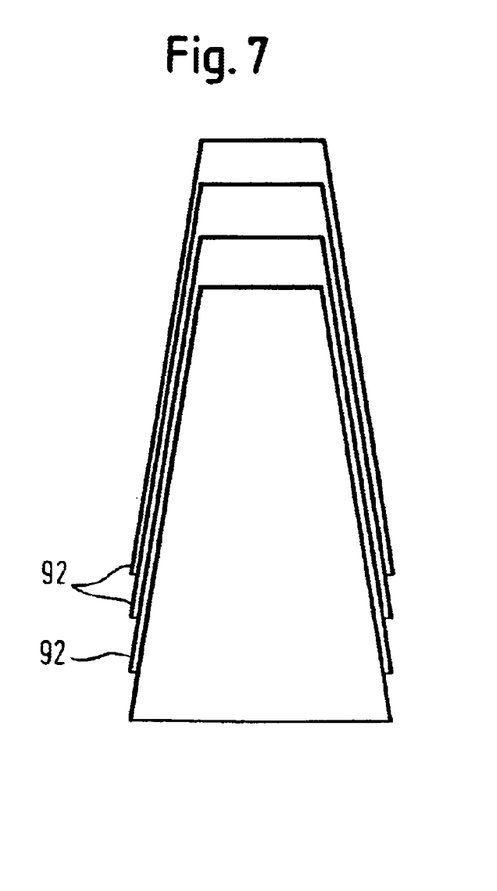
FIG. 7 is a longitudinal section view through central cores arranged within the container according to the invention which are stacked one onto another.

A central core 92 within the container 10 which is placed on the bottom extends upwardly through the middle of the wire coil. The core 92 has a frusto-conical or pyramidal shape and is of cardboard or plastics. The central core 92 is further hollow and of such shape that a plurality of the cores are to be stacked one into another for facilitating transportation for recycling or disposal (see FIG. 7). The central core 92 is placed on the bottom without being fixed thereto. Due to the tapered shape of the core 92 the wire W comes out of the container at a smooth angle, gently touching on the whole length of the core 92.

In the embodiments according to FIGS. 8 through 14, different designs of the stabilising elements 40 are shown.

Figure 8:
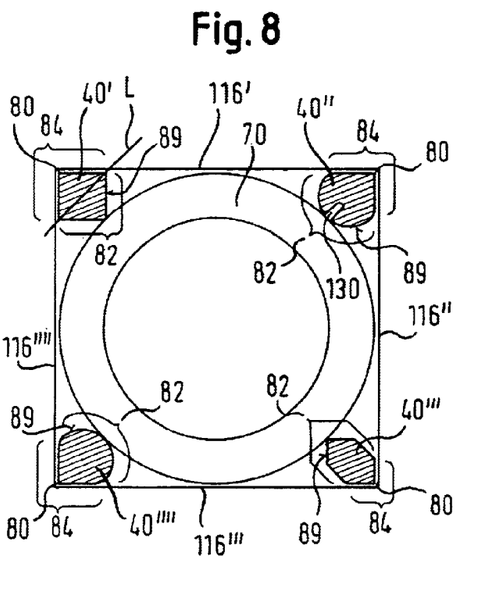
FIG. 8 is a plan view of a container according to the invention showing on each corner stabilising elements according to the different embodiments.
Figure 9:
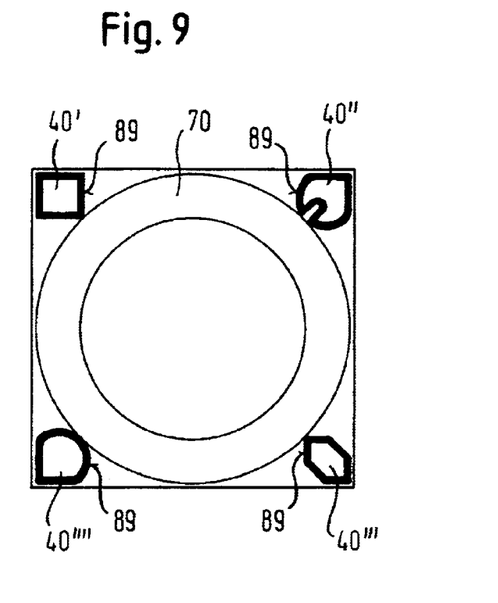
FIG. 9 is a plan view of a container with the stabilising elements of FIG. 8 featured as hollow elements.

FIGS. 8 and 9 show different shapes of stabilising elements 40' to 40"" wherein the stabilising elements 40' to 40"" according to FIG. 8 are sturdy, i.e. full parts, and the stabilising elements 40' to 40"" according to FIG. 9 are parts with a corresponding outer shell portion 89 but are hollow. Each stabilising element 40' to 40"" has a corner portion 84 adapted to the shape of the adjacent corner 80 so that the corner portion 84 contacts the adjacent side wall 16 over its entire surface. Each stabilising element 40' to 40"" has an inner portion 82 which bulges or protrudes towards the interior of the container. Common to all stabilising elements 40' to 40"" is that the elements are of one piece, only, and can be made from cardboard or plastics, metal or wood.

The stabilising elements 40' have a square cross-sectional shape, two sides defining the corner portion 84 and two sides the inner portion 82. The inner portion 82 bulges or protrudes inwardly with respect to a line L through the circumferential ends of contact of the center portion with the side wall 16.

Stabilising elements 40" have a different inner portion 82 in the form of a half-circle with an indentation 130.

Stabilising element 40''' has an inner portion 82 with two parallel sides protruding towards a tip for contacting the wire coil 70.

Stabilising element 40"" has a shape similar to the shape shown in FIG. 3 but is of somewhat more compact design as the inner portion 84 is a half-circle whereas the embodiment according to FIG. 3 has a rounded inner portion extending over more than 180°.

Figure 10:
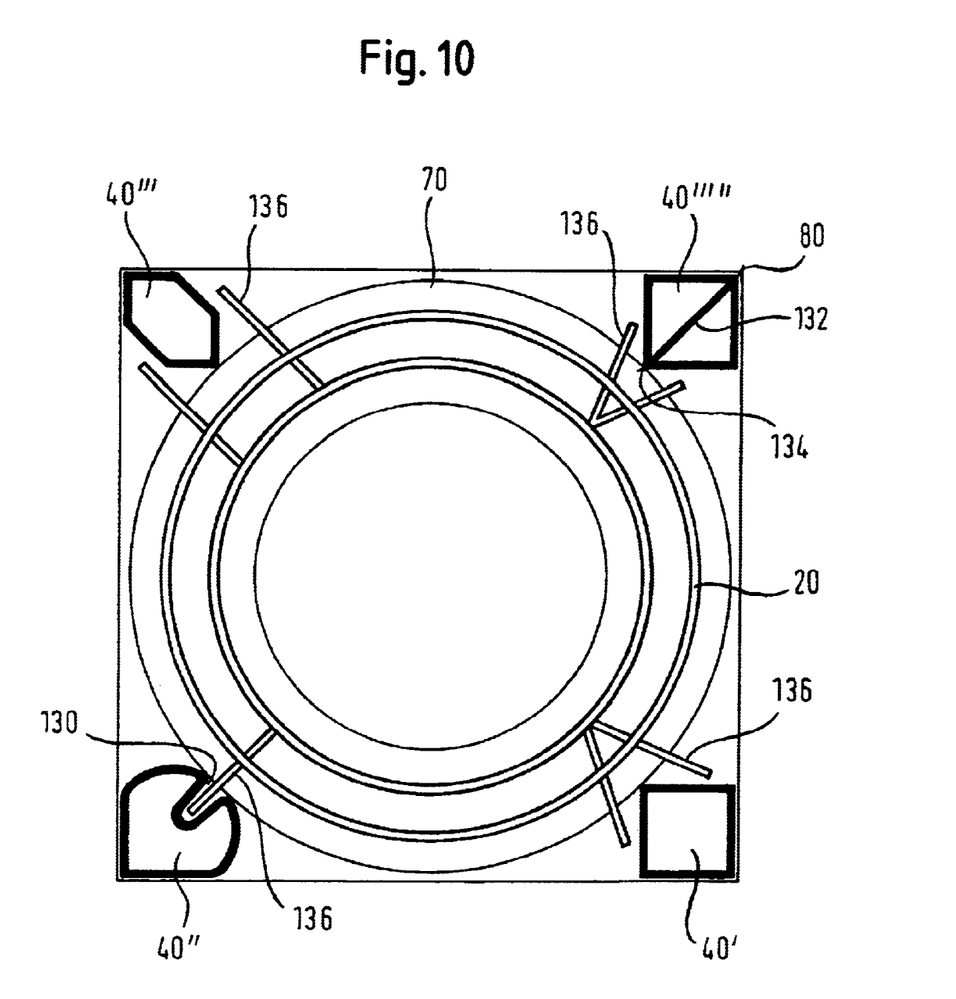
FIG. 10 is a plan view of a container according to a further embodiment with stabilising elements of different design arranged in each corner.

The embodiments of the stabilising elements 40' to 40''' of FIG. 10 correspond to those shown in FIG. 9. Stabilising element 40"" is similar to element 40' but has a stabilising rib 132 extending from the corner 80 towards the inner edge 134 contacting the wire coil 70. This allows a linear force transmission from the inner edge 134 to the corner 80.

Also shown in FIG. 10 is a retainer 20 made from wire. Outwardly protruding wire pieces 136 are provided for guiding the retainer 20 in the vertical direction and to avoid a circumferential displacement by engaging the stabilising elements 40' to 40''' and 40"". The indentation 130 accommodates one wire piece 136 to form a linear guide.

Figure 11:
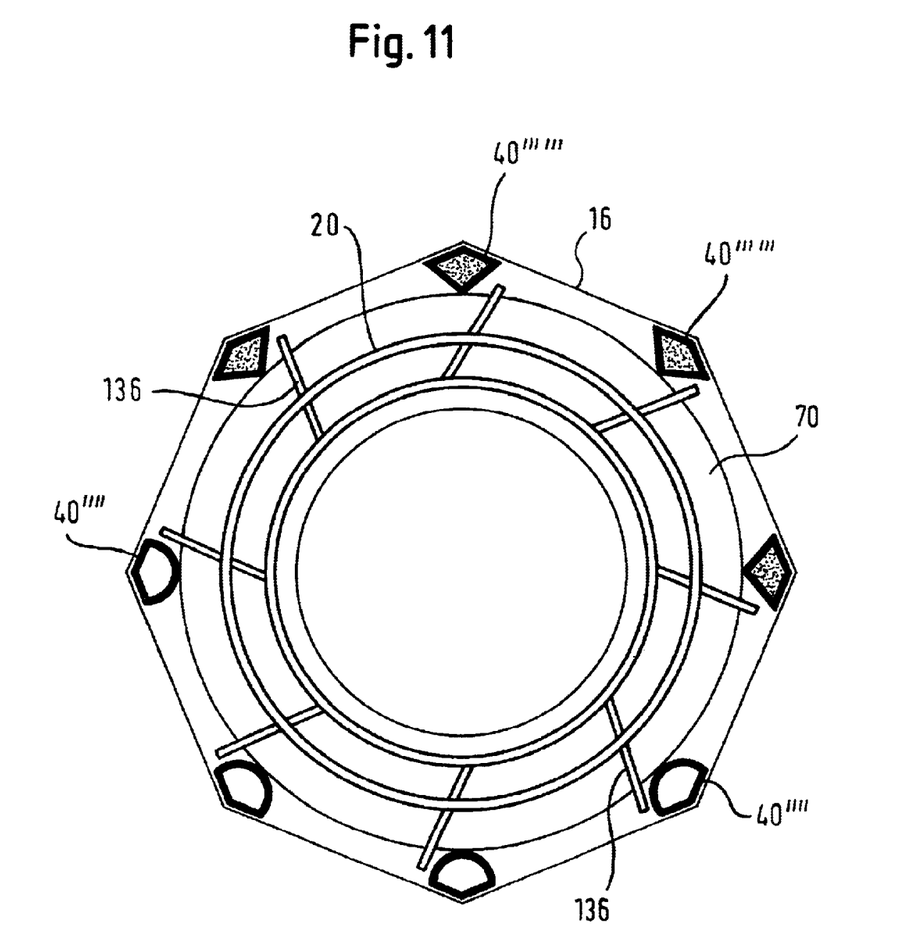
FIG. 11 is a plan view of a container according to a further embodiment showing stabilising elements of different design in the corner.

The embodiment according to FIG. 11 has an octagonal sidewall 16 with different stabilising elements 40"" and 40""" wherein the stabilising elements 40"" are hollow and the stabilising elements 40""" are sturdy parts, e.g. having a foamed core.

Figure 12A:
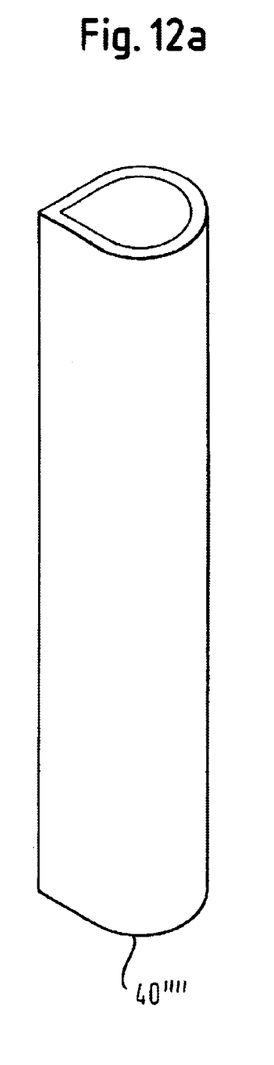
FIG. 12a to FIG. 12c are perspective side views of different stabilising elements which can be used with a container according to the present invention.

The stabilising element 40"" is also shown in FIG. 12a.

Figure 12B:
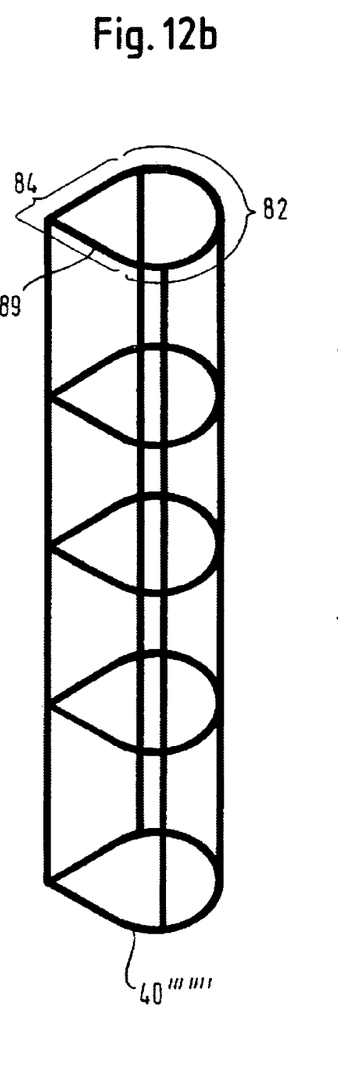

FIG. 12b shows a stabilising element 40""""" in the form of a screen made from wire. Seen from the top, the inner portion 82 defines a continuous inner wall and the outer shell portion 89 is circumferentially closed.

Figure 12C:
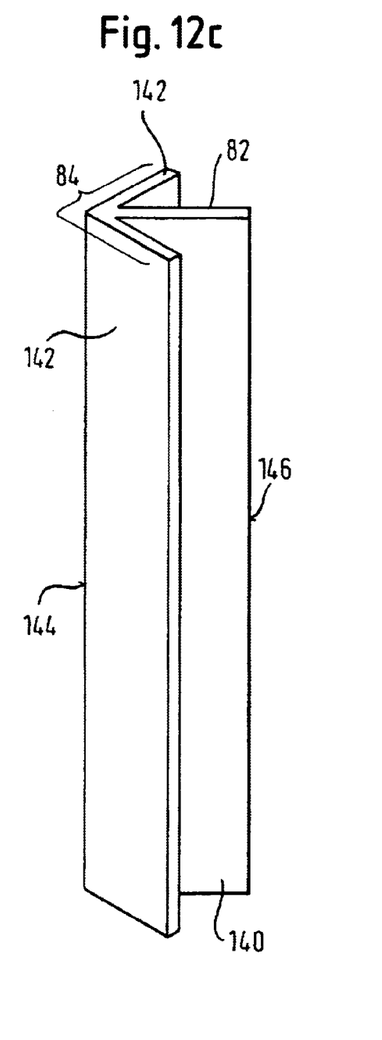

The stabilising element 140 according to FIG. 12c is of different design as it has the shape of an arrow seen from the top. The inner portion 82 is a rib which protrudes like a bisecting line of an angle between the legs 142 defining the corner portions 84. In this embodiment, the corner portion 84 tappers towards an outer edge 144 contacting the adjacent corner. A corner portion 84 and the inner portion 82 define an integral piece so that the force of the wire coil is taken up by edge 44 to be transmitted via the rib-like inner portion 82 immediately into the adjacent corner 80.

Figure 13:
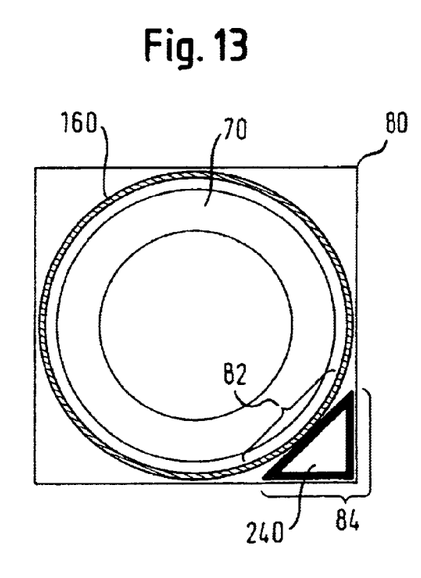
FIGS. 13 and 14 are plan views of containers having an inner wall for increased stability.
Figure 14:
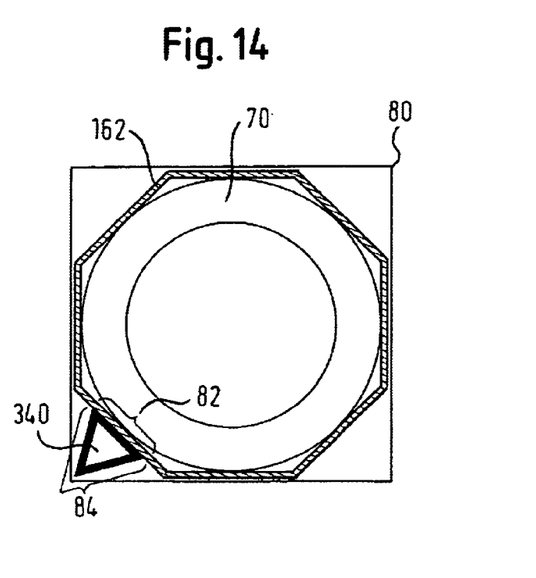

The embodiments according to FIGS. 13 and 14 comprise an inner wall 160, 162, which is closed in circumferential direction without having a through-vertical slit. The inner wall 160 is a circular cylinder, and the inner wall 162 which is also circumferentially closed has an octagonal shape. Both inner walls 160, 162 circumscribe the wire coil 70, contact the wire coil by their inner sides and contact a stabilising element 240, 340 at their outer sides. The inner walls 160, 162 provide for a better guidance of the wire. Although only one stabilising element 240, 340 having a triangular shape is shown in the embodiments according to FIGS. 13 and 14, it should be clear that more or, preferably, all corners 80 have adjacent stabilising elements. The inner walls 160, 162 define a kind of inner frame, and the stabilising elements are the force transmitting connection to the outer frame in form of the body.

What is claimed is:

1. A container for welding wire, comprising:

a box-like body having a bottom and a side wall, said side wall having a polygonal cross section with corners, stabilising elements arranged at at least some of said corners, said stabilising elements extending upwardly from said bottom and having an outer shell portion comprising a corner portion facing said adjacent side wall and an inner portion facing an interior of said container for housing welding wire, said corner portion having a shape adapted to a shape of said adjacent corner, said inner portion defining a continuous inner wall, said container containing a coil of welding wire, and a retainer sitting on top of said welding wire coil for holding down wire coil strands, said retainer having a pair of sidewardly extending protrusions adjacent an associated stabilising element, said inner portion of said associated stabilising element protruding inwards into said interior of said container and between said protrusions to guide said retainer.

2. A container for welding wire, comprising:

a box-like body having a bottom and a side wall, said side wall having a polygonal cross section with corners, stabilising elements arranged at at least some of said corners, said stabilising elements extending upwardly from said bottom and having an outer shell portion comprising a corner portion facing said adjacent side wall and an inner portion facing an interior of said container for housing welding wire, said corner portion having a shape adapted to a shape of said adjacent corner, said inner portion defining a continuous inner wall, said container containing a coil of welding wire, and a retainer sitting on top of said welding wire coil for holding down wire coil strands, said retainer having at least one sidewardly extending protrusion extending into an indentation in said inner portion of an associated stabilising element to be guided by said stabilising elements.

3. A contain for welding wire, comprising:

a box-like body having a bottom and a side wall, said side wall having a polygonal cross section with corners, stabilising elements arranged at at least some of said corners, said stabilising elements extending upwardly from said bottom and having an outer shell portion comprising a corner portion facing said adjacent side wall and an inner portion facing an interior of said container for housing welding wire, said corner portion having a shape adapted to a shape of said adjacent corner, said inner portion defining a continuous inner wall, and a molded and stamped one-piece lid made of plastic arranged at a top of the body closing said container, said lid comprising a transparent material allowing a visual inspection of the interior of said container, wherein said stabilising elements protrude over an upper end of said side wall and are covered by said lid, said lid having an upper plate-shaped portion with an upwardly protruding centre portion, a flat outer portion surrounding said center portion and a ring-shaped collar extending downwardly from said plate-shaped portion and engaging around an outer periphery of an upper edge of said side wall, said container being filled with welding wire being capable of supporting stacked thereon a like container filled with welding wire with a bottom of an upper container being placed on a lid of said lower container.

4. The container according to claim 3, wherein seal is provided between said lid and said body preventing moisture from entering into said container.

5. The container according to claim 4, wherein said seal is one of an adhesive tape and a tight plastic foil which further attaches said lid to said body.

6. The container according to claim 3, wherein a wire end extends outwardly from said container through a wire-exiting hole in said lid and is attached to said container.

7. The container according to claim 6, wherein said wire end extending through said wire-exiting hole is attached to said lid by one of an adhesive tape and a plastic foil which further sealingly closes said wire-exiting hole and prevents moisture from entering into said container.

8. A container for welding wire, comprising:

a box-like body having a bottom and a side wall, said side wall having a polygonal cross section with corners, stabilising elements arranged at at least some of said corners, said stabilising elements extending upwardly from said bottom, being of one piece only, with an outer shell portion being circumferentially closed, seen in an axial direction of said stabilizing elements, to circumscribe an interior of said stabilizing elements, said outer shell portion comprising a corner portion facing said adjacent side wall and an inner portion facing an interior of said container for housing welding wire, said corner portion continuing in one piece with said inner portion, said corner portion having a shape adapted to the shape of said adjacent corner, said corner portion having a corner edge, and said inner portion defining a continuous inner wall and being a section of a cylinder with an outer diameter which is smaller than the maximum width of said stabilizing elements starting from said corner edge and seen in said axial direction.

9. The container according to claim 8, wherein said corner portion contacts said adjacent corner over a large area.

10. The container according to claim 8, wherein said stabilising element is a screen made from a wire which screen defines said outer shell portion.

11. The container according to claim 8, wherein said stabilising element is a sturdy part.

12. The container according to claim 8, wherein said container is filled with welding wire, wherein a retainer sitting on said welding wire for downholding wire coil strands is provided.

13. The container according to claim 12, wherein said retainer has sidewardly extending protrusions which are guided by said stabilising elements.

14. The container according to claim 8, wherein an inner wall arranged between said wire and said stabilising elements is provided, said inner wall circumscribing said wire and, on its inner side, contacting said wire and, on its outer side, contacting said stabilising elements.

15. The container according to claim 8, wherein said container being filled with welding wire, and wherein said container is of such shape and such stability that containers of the same design and filled with welding wire can be double-stacked with a bottom of an upper container being placed on a lower container.

16. The container according to claim 8, wherein said container is filled with welding wire and wherein a support means in the form of a close ring extending along a periphery of said body is provided to avoid deformation of said body by radial pressure of said wire.

17. The container according to claim 16, wherein said support means is a tape wrapped around an outer periphery of said body.

18. The container according to claim 8, wherein said container is filled with welding wire and wherein a central core arranged within said container, placed on said bottom and extending upwardly through a middle of a wire coil is provided, said core tapering in an upward direction.

19. The container according to claim 18, wherein said core has one of a frusto-conical and a pyramidal shape.

20. The container according to claim 18, wherein said central core is hollow and of such shape that a plurality of such cores are able to stacked one into another and wherein said central core is placed on said bottom without being fixed thereto.

21. The container of claim 8, wherein said container contains welding wire which directly lies against said inner portion of said stabilizing elements.

22. The container according to claim 8, wherein said corner portion contacts said adjacent corner over a large area.

23. The container according to claim 8, wherein an angle defining said corner portion and an angle defining said adjacent corner substantially correspond to each other.

24. The container according to claim 8, wherein said stabilising element is hollow.

25. The container according to claim 8, wherein said stabilising element is made from cardboard, plastic, metal or wood.

26. The container according to claim 8, wherein said side wall has a rectangular shape and wherein said corner portion is defined by two flat wall sections extending in an angle of 90° with respect to each other.

27. The container according to claim 8, wherein an inner wall arranged between said wire and said stabilising elements is provided, said inner wall circumscribing said wire and, on its inner side, contacting said wire and, on its outer aide, contacting said stabilising elements.

* * * * *

UNITED STATES PATENT AND TRADEMARK OFFICE
CERTIFICATE OF CORRECTION

PATENT NO. : 6,938,767 B2 Page 1 of 1
DATED : September 6, 2005
INVENTOR(S) : Gelmetti It is certified that error appears in the above-identified patent and that said Letters Patent is hereby corrected as shown below:

Column 12,
Line 9, "wherein seal" should be -- wherein a seal --.

Column 13,
Line 22, "able to stacked" should be -- able to be stacked --.

Column 14,
Line 22, "aide" should be -- side --.

Signed and Sealed this

Second Day of May, 2006

JON W. DUDAS
*Director of the United States Patent and Trademark Office*